April 19, 1966 S. P. ALESSI 3,247,312

SHIELDING ENCLOSURE FOR ELECTRICAL EQUIPMENT

Filed Dec. 26, 1963 3 Sheets-Sheet 1

Inventor:
Samuel P. Alessi
By: Joseph W. Malleck Atty.

Inventor:
Samuel P. Alessi
By: Joseph W. Malleck Atty.

Inventor:
Samuel P. Alessi
By: Joseph W. Malleck Atty.

United States Patent Office 3,247,312

Patented Apr. 19, 1966

3,247,312

SHIELDING ENCLOSURE FOR ELECTRICAL EQUIPMENT

Samuel P. Alessi, Homewood, Ill., assignor to Borg-Warner Corporation, Chicago, Ill., a corporation of Illinois Filed Dec. 26, 1963, Ser. No. 333,496
6 Claims. (Cl. 174—35)

This invention relates to enclosures particularly characterized by radio frequency interference shielding.

Trying to reduce radio frequency interference to a manageable level is one of the most important preoccupations of electronic product designers. How to prevent one piece of equipment from interfering with another, both near and far, has brought forth many suggestions, but few practical solutions. One approach which has seemed most desirable to equipment manufacturers is to build electronic equipment circuits with only nominal attention to RFI reduction, and then mount the entire unit in a cabinet or enclosure which provides whatever RFI protection is needed. However, one of the most difficult problems encountered in RFI proofing cabinets is that of maintaining an adequate RFI seal around necessary openings without interfering with the normal use of the cabinets. The most promising RFI cabinet application is to employ electrically conductive mesh gasketing around all openings, including the door. Such gaskets are effective only if a high degree of pressure is maintained uniformly along such gaskets to insure a proper seal. However, the compression of the mesh gaskets has consistently resulted in a loss or decrease in mesh resiliency over a period of use which results in a permanent set at various heavily compressed areas of the mesh material which virtually destroys the RFI shield and permits severe leaks through the gaps and/or weak pressure contact points caused by the permanent set.

Although the types of RFI gaskets vary with the shape of the opening to be protected and the frequency of use for the opening, the problem has still remained, until this invention, how to insure adequate RFI seals which will last throughout the intended life of the cabinet. To obviate this problem, this invention contemplates providing a unique floating frame interposed between the closable door panel and the margin of the cabinet door opening, the frame carrying spaced and aligned continuous mesh gaskets; the floating frame and gaskets together act much in the manner of a monolithic spring when compressed by the door panel and opening margin. Thus, the required pressure to seal the gasket against the door and opening margins is more uniformly distributed so that the fatigue limit of the gasket mesh material is not as easily reached and the occurrence of surface and pressure deviations in the gasket material, after a period of use, is substantially reduced.

Therefore, a primary object of this invention is to provide an improved radio frequency interference shield for cabinets of the type normally used to enclose electronic equipment.

Another object of this invention is to provide a unique RFI shielding means for electronic cabinets which is adapted to provide adequate pressure promoting an efficient seal of the gasket against the cabinet members, but at the same time obviating the normal loss in resiliency of such gaskets by frequent compression and use.

Yet another object of this invention is to provide a RFI shield means for an electronic cabinet having a door panel adapted to be pivotally moved to a locked position, the RFI shield means being particularly characterized by flexibility in that, when assembled, the shield means will operate at the most effective shielding pressure for different RFI shielding resilient materials and which thereby reduces and equalizes the load throughout such materials, preventing severe localized pressure and loss of resiliency.

This invention consists of a novel construction, arrangement and device to be hereinafter described and claimed for carrying out the above objects and such other objects as will be apparent from the following description of a preferred form of this invention, and illustrated with reference to the accompanying drawings:

Figure 1:
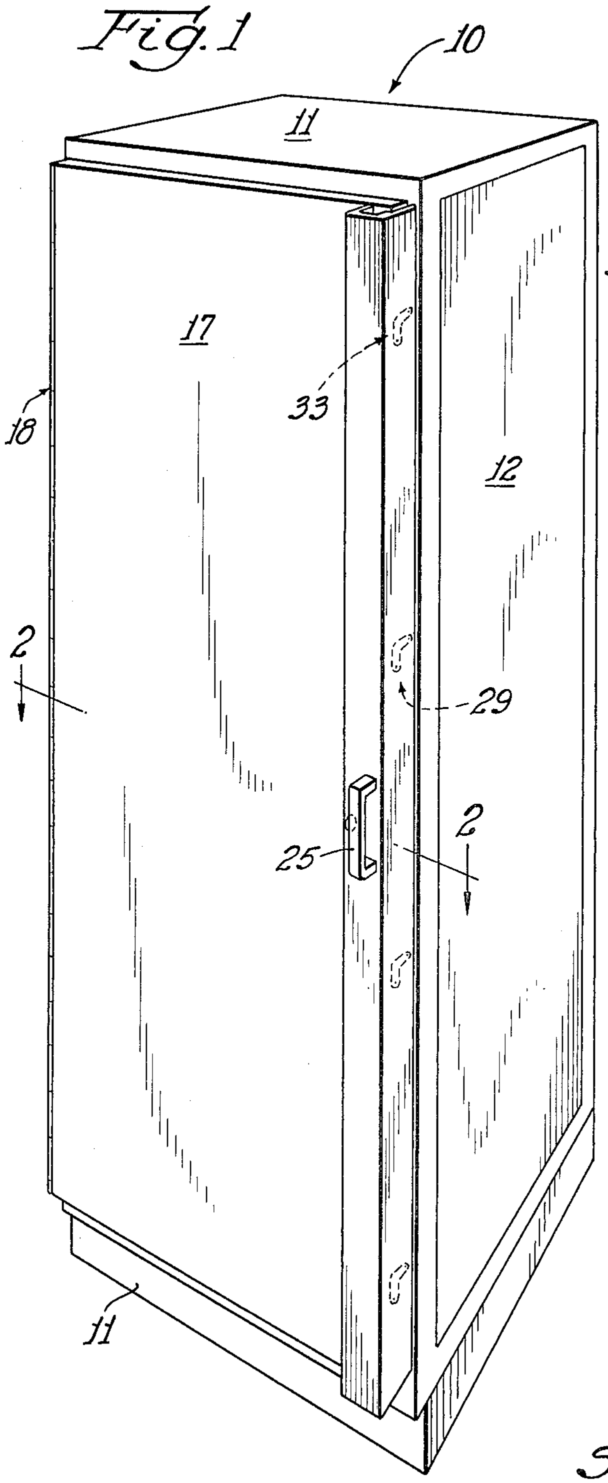
FIG. 1 is a perspective of a typical electronic cabinet construction and adapted to employ the principles of this invention.
Figure 3:
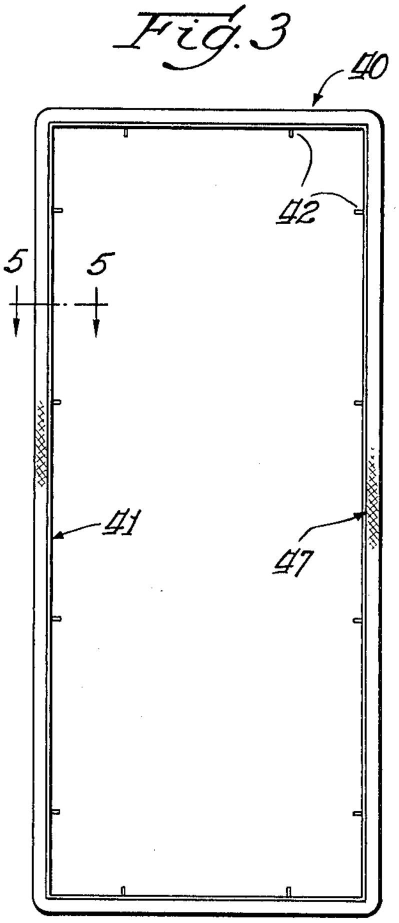
FIG. 3 is a front elevational view of the RFI shielding means.
Figure 4:
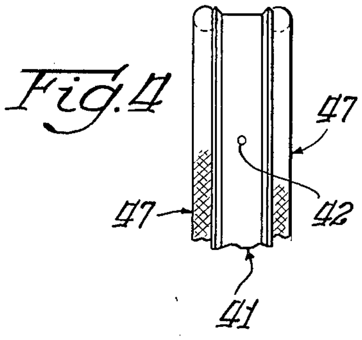
FIG. 4 is a side elevational view of the illustration of FIG. 3.
Figures 2, 5, 6:
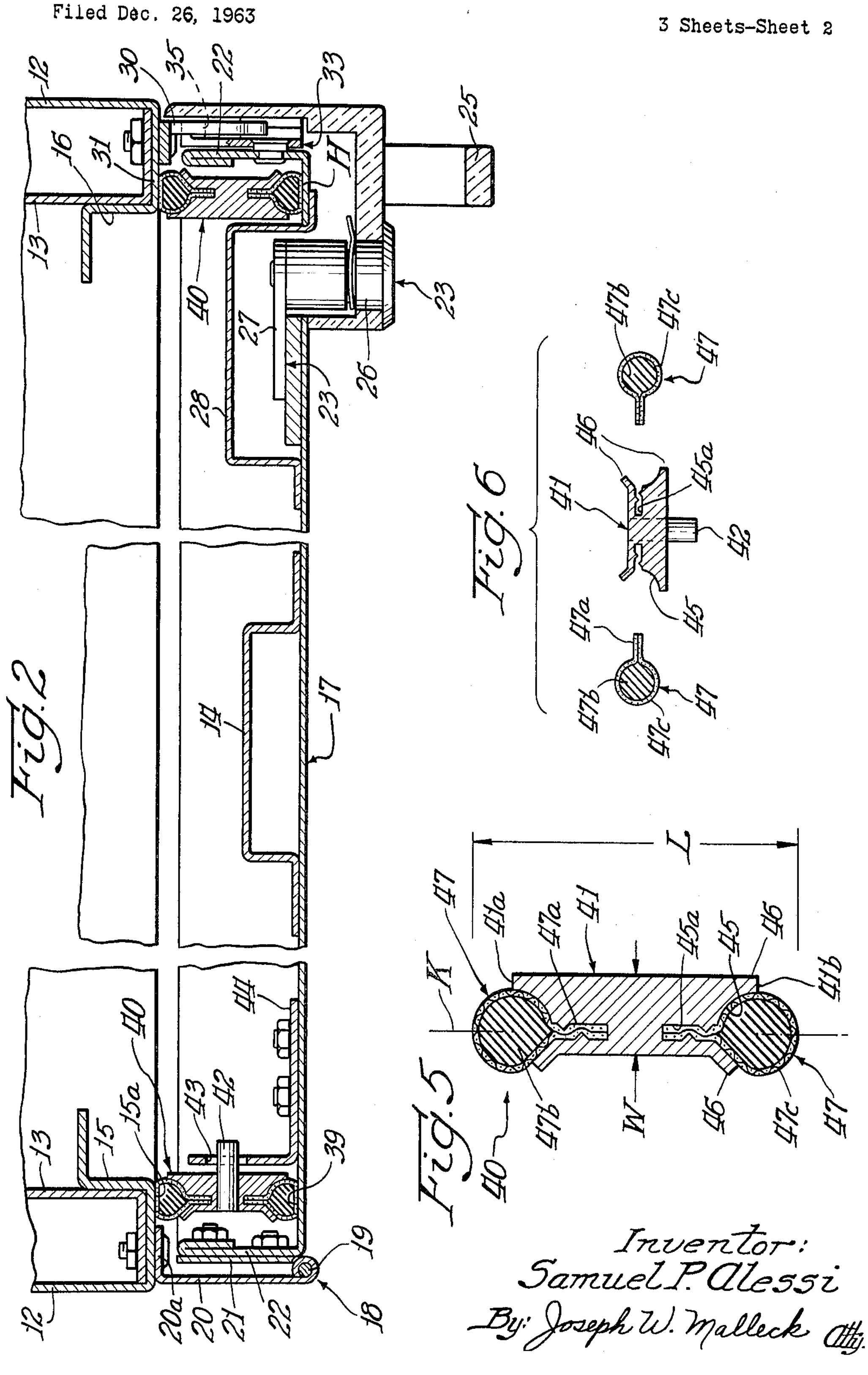
FIG. 2 is a sectional view taken substantially along line 2—2 of FIG. 1, and having portions thereof broken away.
FIG. 5 is an enlarged sectional view taken substantially along line 5—5 of FIG. 3.
FIG. 6 is an exploded view of the illustration of FIG. 5.
Figures 7, 8, 9:
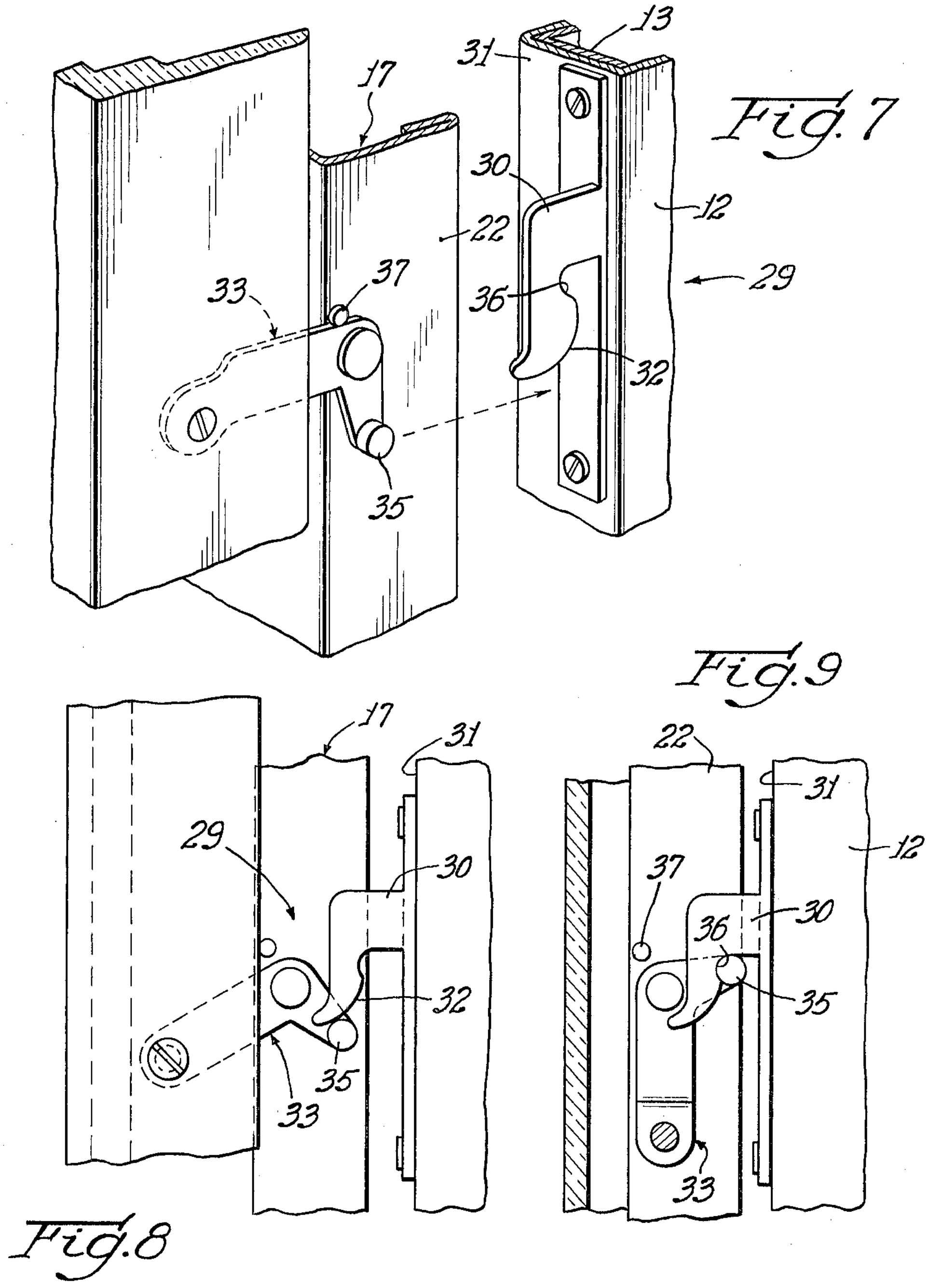
FIG. 7 is a fragmentary perspective view of a portion of the cabinet construction of FIG. 1, illustrating the locking mechanism for the door panel.
FIGS. 8 and 9 illustrate operative positions of the locking mechanism of FIG. 7.

Turning now to the drawings and more particularly to FIGS. 1 and 2, there is illustrated a preferred embodiment of this invention comprising a cabinet 10 of generally rectangular configuration having a recessed base 11 and employing a superstructure adapted to act as a skeleton upon which is mounted a plurality of panels (top panel 11, side panels 12, and back panel), more particularly disclosed in U.S. Patent No. 2,855,261 and which is commonly assigned to the assignee of this invention.

The fragmentary disclosure of the cabinet construction shows vertically disposed strut members 13 to which is bolted or secured side panels 12 of metallic nature, each panel having offset angle flanges 15 at opposite longitudinal sides thereof and adapted to envelope the strut members 13. The angles provide a flat channel surface **15*a* which serves in defining a margin of the door opening 16**.

A door 17 is pivotally mounted by a continuous or latch hinge assembly 18 along one side thereof. The pivotal axis 19 of the hinge is adapted to be disposed adjacent the left-hand margin portion of the door opening and has a first hinge leaf 20 provided with an angle portion **20*a* fastened to the surface 15*a* of the cabinet opening margin, and a hinge leaf 21 fastened to one longitudinal side of the door panel. The door is adapted to be moved and pivoted in an arcuate direction substantially transverse to the plane of the opening margin. The door panel 17 is formed from sheet metal having a plurality of U-shaped ribs 14 extending longitudinally thereof; each side of the door panel is provided with an inwardly bent flanged portion 22 doubled back upon itself to add rigidity and form a rather thick silhouette for the door panel. The door panel has a handle 25 for convenient operation and a cylindrical flange lock 23 having a tubular member 24 mounted in the door panel adjacent the handle and provided with a key turned cylinder 26 carrying a flange 27 adapted to move into an overlapping locking position as actuated by a key. The flange lock is enclosed within a lock housing 28** mounted on the interior portion of the door panel.

A door latch mechanism 29 is employed to provide a tight door closure and comprises a latch bracket 30 mounted upon the right-hand marginal portion 31 of the door opening and carries a depending camming surface 32. A cooperating camming lever 33 is mounted upon the flange portion 22 of the door panel 17. The camming lever has a cam 35 adapted to follow along the camming surface and wedge its way into a recessed portion 36 at the end of the camming surface; the cam 35 cooperates with a stop 37 while being wedged to lock the door in place.

This invention is concerned with radio frequency shielding of cabinet 10 to prevent leakage which would normally tend to radiate from such cabinet through structural seams and openings which are both permanently closed, and those which are frequently opened, such as door openings. Radio frequencies are the result of an electro-magnetic field which, by definition, consists of both magnetic and electric field components. In a radio frequency field the electric and magnetic components vary in a sinusoidal manner, and a definite mathematical relationship exists between them. Shielding of the electrostatic component of the RFI field can be accomplished by a conductive barrier, whereas the shielding of the magnetic component of an RFI field can only be accomplished by a magnetic material. In most cases a suitable electrical conductive shield will also be a suitable magnetic shield material. However, the shield will prevent the propagation of RFI energy in two ways: (a) by energy dissipated in the shield normally referred to as attenuation; or (b) by reflected fields. A high impedance field is one in which the electrical component is predominant and is most successfully shielded by the attenuation manner, whereas a low impedance field is one in which the magnetic component is predominant and is more successfully shielded by the reflected field method.

But merely to know what material to use to block propagation of RFI energy is not enough. It has been found that the shape of the leakage openings is critical. The more a continuous seam or slot can be reduced in an artificial manner to a discontinuous or series of honeycomb openings, the better the chance for complete and accurate shielding. There have been attempts in the art to achieve this discontinuous opening shape; gasketing material of a woven mesh material or other electrically conductive material has been used.

However, in using gasket material and gasket must be compressible sufficiently to conform to the irregularities of both surfaces under the applied force to afford a shield and make the opening discontinuous. In many cases this requires a relatively large compressible effect. The frequency with which such openings, as for doors, must be comprsssed leads to early deterioration of the compressible gasket material and therefore results in substantially complete destruction of the shielding effect. This early deterioration by compressibility is the problem with which this invention is primarily concerned.

The means used to seal off the natural seam or clearance between opening margin 15*a* and the door lip 39 must be capable of withstanding the frequency of use. Pursuant to this, a shielding means 40 is employed comprising a rigid metallic frame 41, here preferably mounted upon the inside of the door 17 by a plurality of pins 42 securely in the frame and extending through slots 43 in longitudinally extending channels 44 on the door. The slots 43 are of a sufficient size to permit movement of said frame in a direction lateral to the plane of the margin 15*a* and thereby lateral to the plane of the door (this movement also being referred to as in the rotative direction of the door). Any typical cross-section of the frame will reveal that the width W is considerably smaller than the lateral dimension L by at least 1:2. The frame has provided at each opposite edge (41*a* and 41*b*) thereof a continuously extending semi-circular groove 45 with a slot 45*a* depending inwardly toward the frame from the bottom of the groove. Such groove and slot may be formed by fingers 46 (see FIG. 6) constituting part of the frame, said fingers being adapted to be clinched together to grip a flange 47*a* of resilient gaskets 47 constituting part of the radio frequence interference shielding.

Each of the gaskets 47 comprises a central continuously extending central rubber core 47*b* having a sleeve of electrically conductive mesh material 47*c* (such as monel or copper wiring), and having a flange 47*a* of such mesh material extending radially outwardly from one side thereof. The flange 47*a* is adapted to be inserted in said slots on opposite sides of the frame and effective to be clinched for adequate rigid support.

The gaskets are spaced at opposite sides of the frame in a manner so that, as the door is closed, force is applied in a direction coincident with a line K drawn between the centers of each of said gaskets. Such force compresses each of the gaskets to provide a double resiliency and permit the entire frame with the gaskets to act as a monolithic spring. It should be understood that the improvements described also apply to single gaskets affixed to the door opening side of the enclosure.

Experts in the field have stated and confirmed that the shielding materials of a woven mesh material (such as used in this invention) can be compressed only to about 60% of the total thickness of the mesh gasket. However, when compressed to this percentage, a permanent set of about 20% occurs. Subsequent use after the permanent set has occurred reducing the shielding effectiveness, and in cases where the gap or joint uneveness is dimensionally over or greater than the 20% permanent set, shielding effectiveness will be completely lost. To avoid this it has been recommended by experts that the average compression in terms of a percentage of the cross-section dimension of mesh gaskets should be about 20% (this is due primarily to the mechanical characteristics of resiliency of the inner core of these particular metallic gaskets). However, merely limiting the degree of compression of such gaskets is not enough. The dimensions of the gaps or spaces (here designated as Delta H in FIG. 2) are of a very small nature in the range of .015" to .032". Furthermore, the difficulty of maintaining uniform gaps is readily appreciated when it is considered that the cabinets or enclosures are constructed of rolled or brake-formed channels and shapes (constituting a superstructure) which have the slight inherent flexibility over their entire length which may range from two to six feet. In vertical enclosures which are made in heights over six feet, a smaller degree of out-of-plumbness can result in an excessive dimensional out-of-alignment at opposite ends.

The producers of radio frequency interference shielding gasketing materials define joints by the maximum amount of uneveness (Delta H) or different height factors. They have set up a class "A" joint which comprises a permanently closed joint; the minimum gasketing material of standard non-frame mounting types must exceed two times the Delta H. In a class "B" joint which has a semi-permanent opening, the gasket height minimum must be three times the total Delta H. In class "C" joints such as involved with this invention, wherein a door or a movable panel is frequently opened and closed, gasketing heights of four times the Delta H are considered the minimum.

Thus, there are at least three factors which must be considered when woven metal gaskets are used. The inherent flexibility of the enclosure superstructure, the reduced compression of the gasket material to 20% or less to enhance its effective life, and the ability of the shielding means to accommodate the use of different metals employed in such mesh material, such as aluminum, Monel, or stronger materials. If each of these factors were to be met by the conventional single type gasket known in the art today, the size and diameter of such materials would become extremely large as well as exhorbitant in cost. The floating frame principle of this invention obviates all of these problems. For example, if a ⅛" diameter resilient core mesh material were used, the maximum total gap differential that can be effectively and efficiently shielded without the floating of frame principle would be .025" (which is 20% x .125"). As previously indicated, this dimensional gap or tolerance is very difficult to maintain uniformly in an electronic enclosure even with the highest quality control. However, a 1/8" diameter material would be quite suitable when used in connection with the floating frame principle, since the frame virtually "floats" to automatically take up one half of the Delta H differential, increasing the allowable gap to .05" if a single RFI shielding of optimum mesh size is used, and to .100" if dual mesh gaskets are mounted on opposite sides to the frame. Thus, 1/10 of an inch tolerance is within comfortable limits that can reasonably be maintained by enclosure manufacturers.

While I have described my invention in connection with certain specific embodiments thereof, it is to be understood that this is by way of illustration and not by way of limitation, and that the scope of my invention is defined solely by the appended claims which should be construed as broadly as the prior art will permit.

I claim:

1. An enclosure shielded against radio frequency interference, comprising: electrically conductive walls defining an enclosed space and having an opening therein provided with a peripheral margin lying within a flat plane; an electrically conductive closure member mounted on said walls and movable between an open position to a locked position for covering said opening of said walls, said closure member having a flat portion adapted to be moved laterally against said opening margin; and electrically conductive sealing means interposed between said margin and closure member flat portion comprising a support extending continuously adjacent said opening margin and being mounted upon said walls and having limited movement in a direction laterally to said margin plane; said electrically conductive sealing means further comprising opposed electrically conductive gaskets mounted upon opposite sides of said support and each extending in parallel relationship along the opening margin, both said gaskets being simultaneously compressed upon movement of said closure member to said locked position whereby said space will be shielded against radio frequency interference, each said gasket contacting only one of said margin or closure member flat portion.

2. An enclosure shielded against radio frequency interference as in claim 1, in which said closure member is pivoted about an axis adjacent one side of said opening and in which said support comprises a continuous fixture having slots therein receiving pins mounted upon said closure member and being movable laterally and in the direction of pivotal movement of said closure member.

3. An enclosure shielded against radio frequency interference as in claim 1, in which said gaskets each are comprised of a central resilient core having a woven mesh material sleeve about said core, said mesh material being of an electrically conductive nature and adapted for limited resilient compression.

4. An enclosure shielded against radio frequency interference as in claim 1, in which said gaskets are aligned with each other in a direction perpendicular to the plane of said opening margin.

5. An enclosure shielded against radio frequency interference, comprising: electrically conductive walls defining an interior space and an opening in said walls defined by a continuous lip; a door mounted on said walls and movable to a locked position closing off said opening, said door having a continuous lip with a configuration substantially paralleling that of the opening lip, said opening and door lips being adapted to be moved into continuous contact therealong; and resilient electrically conductive means interposed between said lips effective to serve as a gasket; and a radio frequency interference shield about said opening when said door is locked, said conductive sealing means being particularly characterized by a floating frame having a configuration substantially paralleling each of said lips and being mounted upon said enclosure for movement relative to or from each of said lips, said frame carrying resilient conductive gaskets at opposite sides thereof and being spaced apart a dimension greater than the width of each of said gaskets.

6. An enclosure shielded against radio frequency interference as in claim 5, in which each of said gaskets is formed with a resilient rubber core having a sleeve of electrically conductive mesh thereabout, each gasket having a flange extending radially outwardly from one side thereof, said frame having spaced fingers at each side thereof gripping said gasket flanges for mounting the same thereon.

References Cited by the Examiner

UNITED STATES PATENTS

| | | | |
|---|---|---|---|
| 3,026,367 | 3/1962 | Hartwell | 174—35 |
| 3,055,969 | 9/1962 | Schaller | 174—35 |
| 3,129,278 | 4/1964 | Watt et al. | 174—35 |

DARRELL L. CLAY, *Examiner.*

JOHN F. BURNS, *Primary Examiner.*